(12) United States Patent
Bharati

(10) Patent No.: US 11,955,029 B2
(45) Date of Patent: Apr. 9, 2024

(54) SYSTEM AND METHOD FOR INDOOR SITUATIONAL AWARENESS AND NAVIGATIONAL AID FOR THE VISUALLY IMPAIRED USER

(71) Applicant: Vivek Satya Bharati, Los Altos, CA (US)

(72) Inventor: Vivek Satya Bharati, Los Altos, CA (US)

( * ) Notice: Subject to any disclaimer, the term of this patent is extended or adjusted under 35 U.S.C. 154(b) by 595 days.

(21) Appl. No.: 17/222,614

(22) Filed: Apr. 5, 2021

(65) Prior Publication Data

US 2021/0358329 A1 Nov. 18, 2021

(51) Int. Cl.

| | | |
|---|---|---|
| G09B 21/00 | (2006.01) |
| G01C 21/20 | (2006.01) |
| G01S 7/62 | (2006.01) |
| G01S 17/08 | (2006.01) |
| G01S 17/89 | (2020.01) |
| G01S 17/93 | (2020.01) |
| G06Q 10/047 | (2023.01) |

(52) U.S. Cl.
CPC .......... *G09B 21/007* (2013.01); *G01C 21/206* (2013.01); *G01S 7/629* (2013.01); *G01S 17/08* (2013.01); *G01S 17/89* (2013.01); *G01S 17/93* (2013.01); *G06Q 10/047* (2013.01)

(58) Field of Classification Search
CPC ...... G09B 21/00; G09B 21/007; G01C 21/20; G01C 21/206; G01S 7/62; G01S 7/629; G01S 17/08; G01S 17/89; G01S 17/93; G06Q 10/04; G06Q 10/047
See application file for complete search history.

(56) References Cited

U.S. PATENT DOCUMENTS

| 10,024,678 | B2* | 7/2018 | Moore | G01C 21/1656 |
| 11,187,906 | B2* | 11/2021 | Watola | G06T 5/002 |
| 2016/0156850 | A1* | 6/2016 | Werblin | G06F 3/013 |
| | | | | 348/63 |
| 2019/0180421 | A1* | 6/2019 | Kim | G06T 5/007 |

* cited by examiner

*Primary Examiner* — Timothy A Musselman

(57) ABSTRACT

A system and method for providing indoor situational awareness and navigational aid for the visually impaired user, is disclosed. The processor may receive input data. The processor may enhance the image based upon the angle and the depth information. The processor may determine "directional saliency", "saliency at rest" and "saliency in motion" of the enhanced image of the scene to provide situational awareness and generate a virtual graph with a grid of nodes. The processor may probe each node in order to check whether or not the point corresponding to said node is on a floor and determine the shortest path to a destination in the virtual graph by only considering the points on the floor. The processor may convert the description of the shortest path and the scene into one or more of audio or Braille text instruction to the user.

21 Claims, 7 Drawing Sheets

SYSTEM AND METHOD FOR INDOOR SITUATIONAL AWARENESS AND NAVIGATIONAL AID FOR THE VISUALLY IMPAIRED USER

TECHNICAL FIELD

The present application described herein, in general, relates to a system and a method for providing indoor situational awareness and navigational aid for the visually impaired user.

BACKGROUND

Vision has long been one of the most impactful of senses in the animal kingdom with regards to the perception of one's surroundings and local threats to one's well-being. Especially for human beings, vision is a critical and defining ability that helps dictate one's day-to-day activities. Blind and Visually Impaired (BVI) individuals sometimes depend on caregivers or tools, such as a white cane, to go about their daily life. An important group of BVI individuals are those who have lost their eyesight after having it for several years (and therefore can mentally visualize objects and surroundings if described).

Recent advancements in neural networks can provide a more natural and fuller description of the surroundings in natural language compared to audio-tone representations of obstacles and pathways for BVI individuals. Captioning models generate textual annotations of specific regions of a given image. An example is the DenseCap model. The DenseCap model is a Fully Convolutional Localization Network (FCLN) composed of a Convolutional Network, dense localization layer, and a Recurrent Neural Network language model. The DenseCap model may generate dense and rich annotations of images in a single forward pass. It is trained on the Visual Genome dataset and returns multiple captions and their associated bounding boxes for any input image. The primary objective of the DenseCap model is to gain a semantic understanding of a visual scene with applications such as image retrieval in mind. Due to focus on such applications and a reliance on 2D image data, the DenseCap model does not provide distance information or direction information that would be needed by the BVI user to reconstruct the scene mentally. For example, the DenseCap model may return 'A man sitting on a couch, a mirror on the wall' when analyzing a scene.

LiDAR and camera-based navigation systems in autonomous cars in outdoor settings have the benefit of a top-down view of their surroundings, in the form of a map. However, in dynamic indoor settings, top-down views are not viable, and therefore the paths around certain obstacles may not be self-evident.

Thus, a need exists in the art of a wearable, power-efficient, and cost-effective system that could describe one's indoor surroundings with the use of an enhanced scene descriptor and text-to-speech converter in a way that helps to create situational awareness and also help them safely navigate their surroundings at walking speed.

SUMMARY

This summary is provided to introduce concepts related to systems and methods for providing situational awareness and navigational aid for the visually impaired user and the concepts are further described below in the detailed description. This summary is not intended to identify essential features of the claimed subject matter nor it is intended for use in determining or limiting the scope of the claimed subject matter.

In one implementation, a system for providing situational awareness and navigational aid for the visually impaired user, is disclosed. The system may comprise a motion sensor configured to detect motion of the user. The system may further comprise an image sensor configured to capture an image of the scene, in front of the user. The system may further comprise a compass. The system may further comprise a depth sensor. The depth sensor is configured to provide the depth/distance information. The system may further comprise a processor and a memory. The processor may be configured to execute instructions stored in the memory for receiving input data provided by the motion sensor, the image sensor, the compass, and the depth sensor. The processor may be further configured for enhancing, the image captured by the image sensor based upon the angle and the depth information provided by the depth sensor. The processor may be further configured for determining, "directional saliency", "saliency at rest" and "saliency in motion" of the enhanced image of the scene to provide situational awareness, wherein situational awareness at least includes the depth or distance information and a directional orientation. The processor may be further configured for generating a virtual graph with a grid of nodes equidistant from each other within the enhanced image of the scene. The processor may be configured for probing each node of the grid of nodes in order to check whether or not the point corresponding to said node is on a floor. The processor may be further configured for determining the shortest path to a destination in the virtual graph by only considering the points on the floor. The processor may be further configured for converting the description of the shortest path and the scene into one or more of audio or Braille text instruction to the user, wherein the description is enhanced with the distance information and directional orientation and ordered by "directional saliency", "saliency at rest" or "saliency in motion".

In another implementation, a method for providing situational awareness and navigational aid for the visually impaired user, is disclosed. The method may comprise receiving, via a processor, input data provided by a motion sensor, an image sensor, a compass, and a depth sensor. The method may further comprise enhancing, via the processor, the image captured by the camera based upon the angle and the depth information provided by the depth sensor. The method may further comprise determining, via the processor, "directional saliency", "saliency at rest" and "saliency in motion" of the enhanced image of the scene to provide situational awareness, wherein situational awareness at least includes the depth or distance information and a directional orientation. The method may further comprise generating, via the processor, a virtual graph with a grid of nodes equidistant from each other within the enhanced image of the scene. The method may comprise probing, via the processor, each node of the grid of nodes in order to check whether or not the point corresponding to said node is on a floor. The method may further comprise determining, via the processor, the shortest path to a destination in the virtual graph by only considering the points on the floor. The method may further comprise converting, via the processor, the description of the shortest path and the scene into an audio or Braille text instruction or a combination thereof to the user, wherein the description is enhanced with the distance information and directional orientation and ordered by "directional saliency", "saliency at rest" or "saliency in motion".

In yet another implementation, non-transitory computer readable medium storing program for providing situational awareness and navigational aid for the blind and visually impaired user is disclosed. The program may comprise programmed instructions for receiving input data provided by a motion sensor, an image sensor, a compass, and a depth sensor. Further, the program may comprise programmed instructions for enhancing the image captured by the camera based upon the angle and the depth information provided by the depth sensor. The program may further comprise programmed instructions for determining "directional saliency", "saliency at rest" and "saliency in motion" of the enhanced image of the scene to provide situational awareness, wherein situational awareness at least includes the depth or distance information and a directional orientation. The program may comprise programmed instructions for generating a virtual graph with a grid of nodes equidistant from each other within the enhanced image of the scene. The program may further comprise programmed instructions for probing each node of the grid of nodes in order to check whether or not the point corresponding to said node is on a floor. The program may comprise programmed instructions for determining the shortest path to a destination in the virtual graph by only considering the points on the floor. Furthermore, the program may comprise programmed instructions for converting the description of the shortest path and the scene into an audio or Braille text instruction or a combination thereof to the user, wherein the description is enhanced with the di stance information and directional orientation and ordered by "directional saliency", "saliency at rest" or "saliency in motion".

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
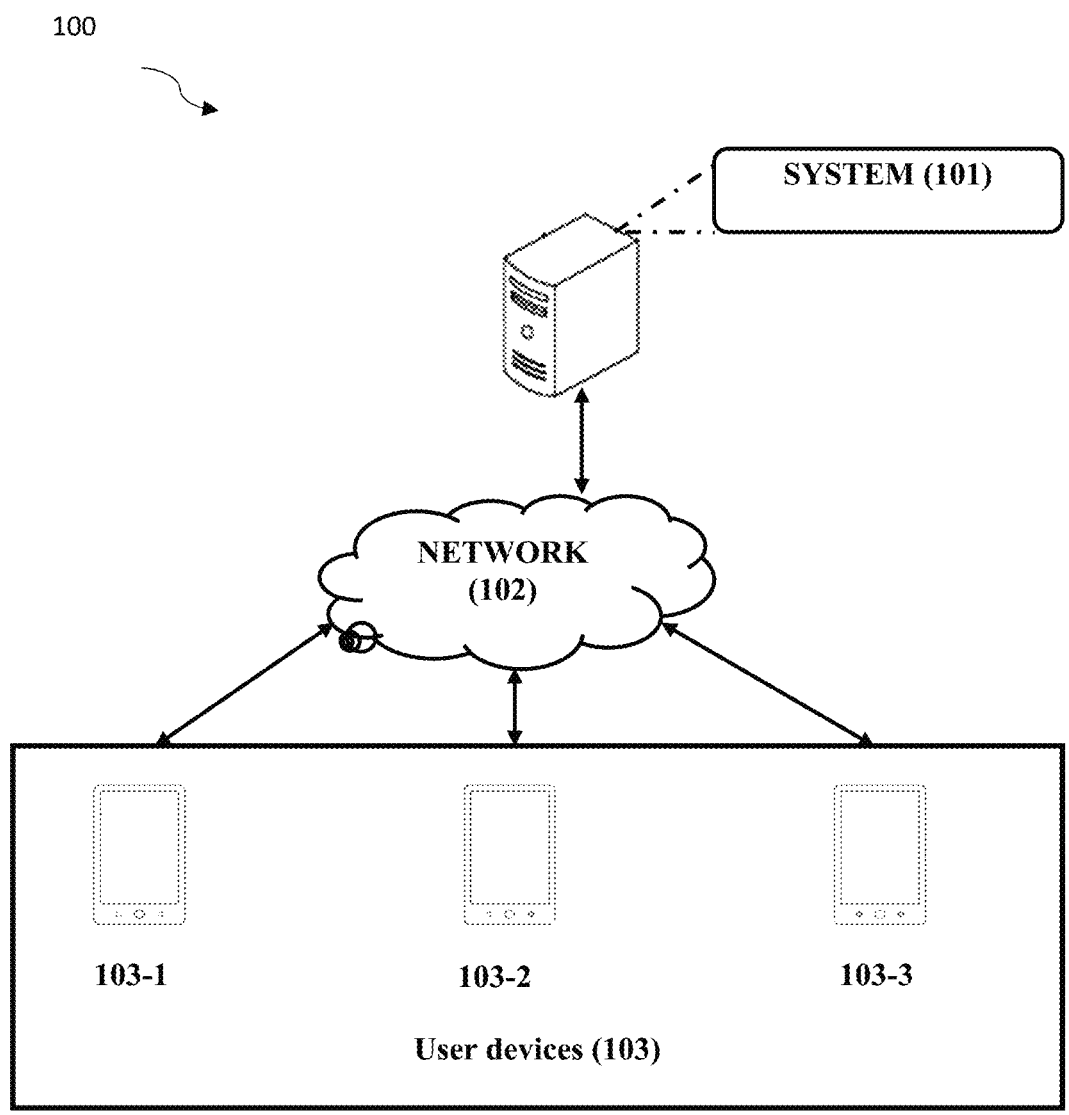
FIG. 1 illustrates an implementation of a system for providing indoor situational awareness and navigational aid for the visually impaired user, in accordance with an embodiment of the present disclosure.

Now referring to FIG. 1, a system (101) for providing situational awareness and navigational aid for the visually impaired user in accordance with an embodiment of a present disclosure is illustrated. In one embodiment, the system (101) may comprise a motion sensor, an image sensor, a compass, and a depth sensor. The system may further comprise a processor (201) and a memory (203).

In an embodiment, the system (101) may be connected to a user device (103) over a network (102). It may be understood that the system (101) may be accessed by multiple users through one or more user devices (103-1), (103-2), (103-3) . . . (103-n), collectively referred to as a user device (103). The user device (103) may be any electronic device, communication device, image capturing device, machine, software, automated computer program, a robot or a combination thereof.

In an embodiment, though the present subject matter is explained considering that the system (101) is implemented on a server, it may be understood that the system (101) may also be implemented in a variety of user devices, such as, but not limited to, a portable computer, a personal digital assistance, a handheld device, a mobile, a laptop computer, a desktop computer, a notebook, a workstation, a mainframe computer, a mobile device, and the like. In one embodiment, system (101) may be implemented in a cloud-computing environment. In an embodiment, the network (102) may be a wireless network such as Bluetooth, Wi-Fi, 3G, 4G/5G/LTE and alike, a wired network or a combination thereof. The network (102) can be accessed by the user device (103) using wired or wireless network connectivity means including updated communications technology.

In one embodiment, the network (102) can be implemented as one of the different types of networks, cellular communication network, local area network (LAN), wide area network (WAN), the internet, and the like. The network (102) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network (102) may include a variety of network devices, including routers, bridges, servers, computing devices, storage devices, and the like.

Figure 2:
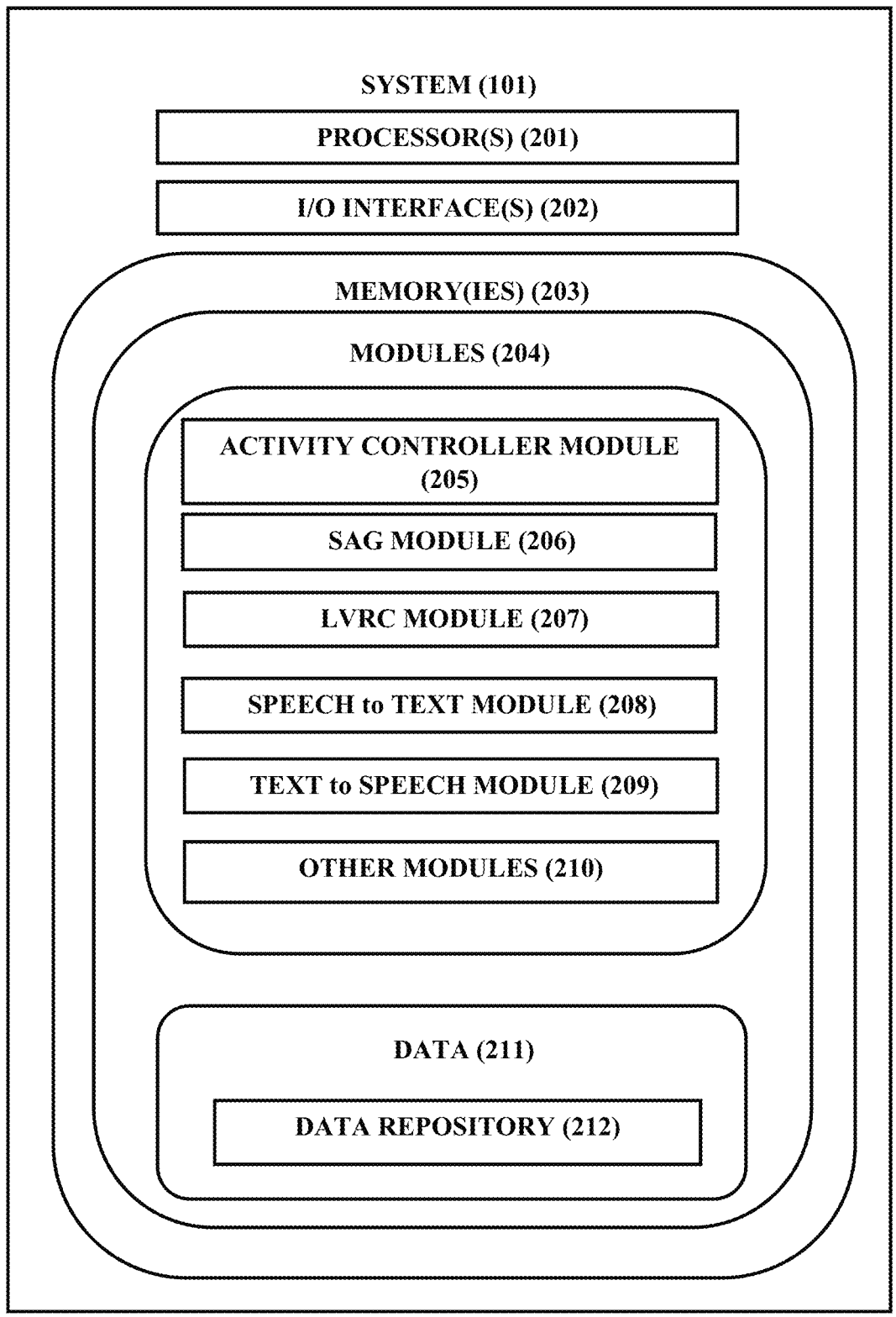
FIG. 2 illustrates components of the system (101), in accordance with an embodiment of the present disclosure.

Further, referring to FIG. 2, components of the system (101) may include at least one processor (201), an input/output interface (202), a memory (203), Module (204) and data (210). In one embodiment, the at least one processor (201) is configured to fetch and execute computer-readable instructions stored in the memory (204).

In one embodiment, the I/O interface (203) may be implemented as a mobile application or a web-based application, and may further include a variety of software and hardware interfaces, for example, a web interface, a graphical user interface, Braille interface and the like. The I/O interface (202) may allow the system (101) to interact with the user devices (103). Further, the I/O interface (202) may enable the user device (103) to communicate with other computing devices, such as web servers and external data servers (not shown). The I/O interface (202) can facilitate multiple communications within a wide variety of networks and protocol types, including wired networks, for example, LAN, cable, etc., and wireless networks, such as WLAN, cellular, or satellite. The I/O interface (202) may include one or more ports for connecting to another server. In an exemplary embodiment, the I/O interface (202) is an interaction platform which may provide a connection between users and system (101).

In an implementation, the memory (203) may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory (203) may include data (208).

In one embodiment, the module (204) may include, routines, programs, objects, components, data structures, etc. which perform particular tasks, functions, or implement particular abstract data types. The data (210) may comprise a data repository (211). In one implementation, the module (204) may include an activity controller module (205), a situational awareness generator module (SAG) (206), a Lateral View Route Calculator (LVRC) module (207), a Speech to text module (208), a text to speech module (209) and other modules (210).

The aforementioned computing devices may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1×RTT, GSM/GPRS, EDGE, HSDPA, HSDPA, 5G and others.

The aforementioned computing devices and networks may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electromagnetic induction (EMI) communication, passive or active RFID communication, micro-impulse radar (MIR), ultra-wide band (UWB) communication, automatic identification and data capture (AIDC) communication, and others.

The working of the system (101) for will now be described in detail referring to FIGS. 1,2, 3, 4, 5 and 6 as below.

In one embodiment, the user may provide input data such as wake up words or voice commands or an input by Braille keyboard to the system (101) via user device (103). The system (101) may detect the speech of the wake up words or voice command or the input by Braille keyboard and convert the speech into the text. Now referring to FIG. 3, the overall functioning of the system (101) in accordance with an embodiment of the present disclosure. In one embodiment, the motion sensor may be configured to detect motion of a user. In one exemplary embodiment, the motion sensor may be an accelerometer. In one embodiment, the image sensor may be configured to capture an image of the scene, in front of the user. In one exemplary embodiment, the image sensor may be a camera. In one embodiment, the compass may be configured to provide directions. In one embodiment, the depth sensor may be configured to provide the depth information. In one exemplary embodiment, the depth sensor may be a Light Detection and Ranging (LiDAR) system.

Figure 3:
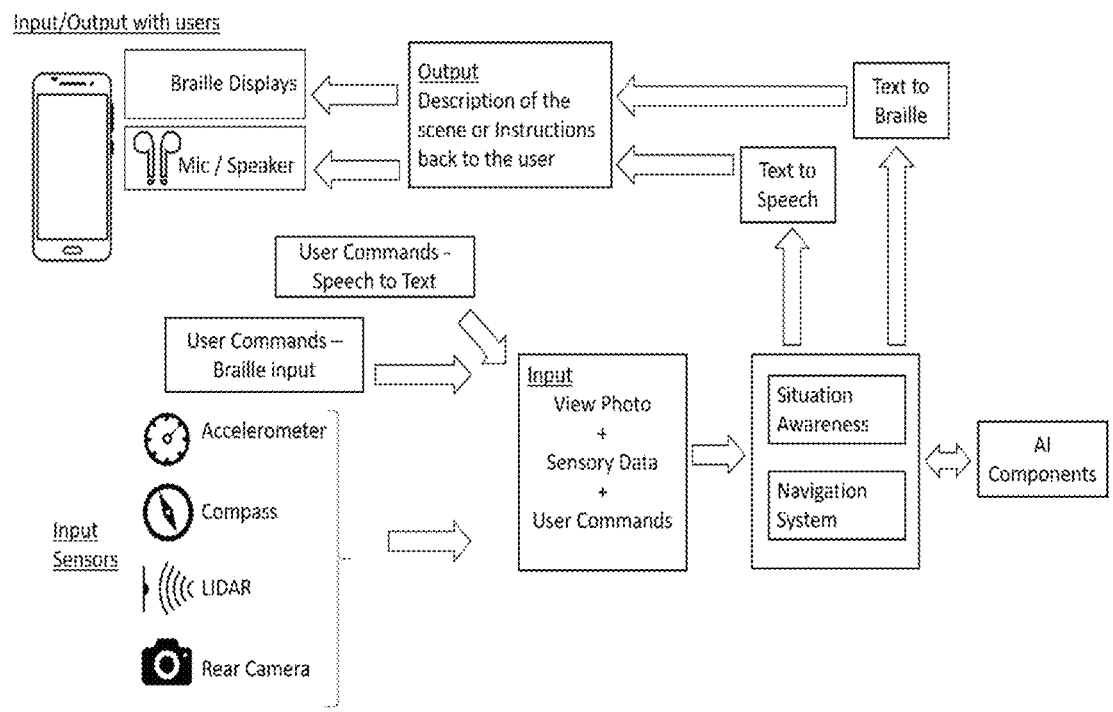
FIG. 3 illustrates an overall functioning of the system (101), in accordance with an embodiment of the present disclosure.

Now referring to FIGS. 2 and 3, the processor (201) may be configured to receive input data provided by the motion sensor, the image sensor, the compass and the depth sensor. In one embodiment, the activity controller module (205) may be configured to receive the text and input data provided by the motion sensor and the compass. The activity controller module (205) may be configured to trigger actions of the system (101) based on sensor input. In one exemplary embodiment, the activity monitor controller module (205) may be configured to trigger a path description in a certain direction, when movement is detected by the accelerometer or a speech command is received.

Figure 4:
FIG. 4 illustrates the bounding boxes generated by the Captioning model without any enhancement, in accordance with an embodiment of the present disclosure.
Figure 5:
FIG. 5 illustrates a 3D mesh superimposition generated from the ARKit, in accordance with an embodiment of the present disclosure.

Now referring FIG. 4, the bounding boxes generated by the Captioning model without any enhancement in accordance with the embodiment of the present disclosure is illustrated. The scene captions such as plant in pot, large door may be provided to the bounding boxes. Now again referring to FIGS. 2 and 3, the processor (201) may be configured for enhancing the image captured by the image sensor based upon the angle and the depth information provided by the depth sensor. The processor (201) may be configured for enhancing the image captured by the image sensor based upon the angle and the depth information provided by the depth sensor. In one exemplary embodiment, enhanced scene caption such as "plant in a pot at 10 O'clock 5 feet away", "large door at 12 O'clock 10 feet away" may be provided to the bounding boxes. In one embodiment, the situational awareness generator module (SAG) (206) may be configured for determining "directional saliency", "saliency at rest" and "saliency in motion" of the enhanced image of the scene to provide situational awareness. In one embodiment, the situational awareness at least includes the depth or distance information and a directional orientation. In one embodiment, the "saliency" may be defined as the important parts of an image or scene. In one embodiment, the system (101) may provide an option for ordering, wherein the option for ordering may perform ordering of objects and people from left to right or right to left based upon preference(s) selected by the user. It is to be noted herein that the ordering of the objects and people from left to right or right to left based upon the preference(s) selected by the user is also referred as "directional saliency". In one embodiment, the "saliency at rest" may be determined by returning a plurality of scene captions and their associated bounding boxes ordered by the order in which the areas within these bounding boxes would have captured the attention of a human user. In one embodiment, the "saliency in motion" may be determined by returning a plurality of scene captions and their associated bounding boxes ordered by first those directly in front of the user by distance (closest first) and then those not directly in front of the user.

In one exemplary embodiment, the plurality of scene captions and their associated bounding boxes may be returned by a Captioning model for the image captured by the camera. Further, the plurality of scene captions and their associated bounding boxes may be enhanced with the depth information from LiDAR system and the angle at the center of the bounding box. The Captioning model is enhanced with the distance information from LiDAR system/sensor and computed angle information derived from the image. The situational awareness generator module (206) may provide a detailed description of the scene. The detailed description of scene may be 'A man sitting on a couch 4 feet away at 10 O'clock, a mirror on the wall 7 feet away at 3 O'clock.' The system (101) may be configured to use an 'attention-based saliency' model. The 'attention-based' saliency model may be derived from datasets with information on where humans looked when presented with a scene. The 'attention-based' saliency model is a human centric model. Further, the human centric model may be used to drive the Saliency at Rest' ordering of the caption.

Further, the distance and the directional orientation of the enhanced scene caption is sorted based on the "Saliency at Rest" through an iterative process. The scene captions bounding boxes closest to the saliency bounding box returned by the operating system are collected first. In one exemplary embodiment, the operating system may be configured for computing the center point of the bounding boxes. Further, the operating system may be configured for computing the Euclidean distance between saliency and the scene captions center points.

In one embodiment, the process of returning scene captions bounding boxes closest to the saliency bounding box and collecting the captions for these bounding boxes may be iteratively performed in order to form ordered set of scene captions. In one embodiment, the "saliency at rest" may be configured to provide description of the components of the image which captures an attention of the user. In one embodiment, the "saliency in motion" may be determined by distance ordering provided by the LiDAR system. The "saliency in motion" may be configured to provide description of the component of the image, which is closest to the user, when the user is in motion. In one embodiment, the "directional saliency" may be determined by ordering the bounding boxes from the left-most bounding box to the right-most bounding box in a strict clock-wise direction or in the exact reverse order based on the preference of the user.

In one embodiment, the processor (201) may be configured for generating a virtual graph with a grid of nodes equidistant from each other overlaid within the enhanced image of the scene. In one embodiment, the Lateral View Route Calculator (LVRC) module (207) may be configured for overlaying a virtual graph, with the grid of nodes equidistant from each other within the scene, in front of the user. The virtual graph with the grid of nodes may comprise fixed grid of points overlaid within the scene, in front of the user. In one embodiment, each node in the virtual graph may be explored using Raycast in order to classify the space represented by the node as a floor or a distinct object.

In one embodiment, the processor (201) may use ARKit to generate the environment probe textures from the camera imagery and render reflective virtual object. The environment probe is an image that captures the view in all directions from certain point in the scene. Now referring to FIG. 5, a 3D mesh superimposition generated from the ARKit is illustrated, in accordance with an embodiment of the present disclosure.

Figure 6:
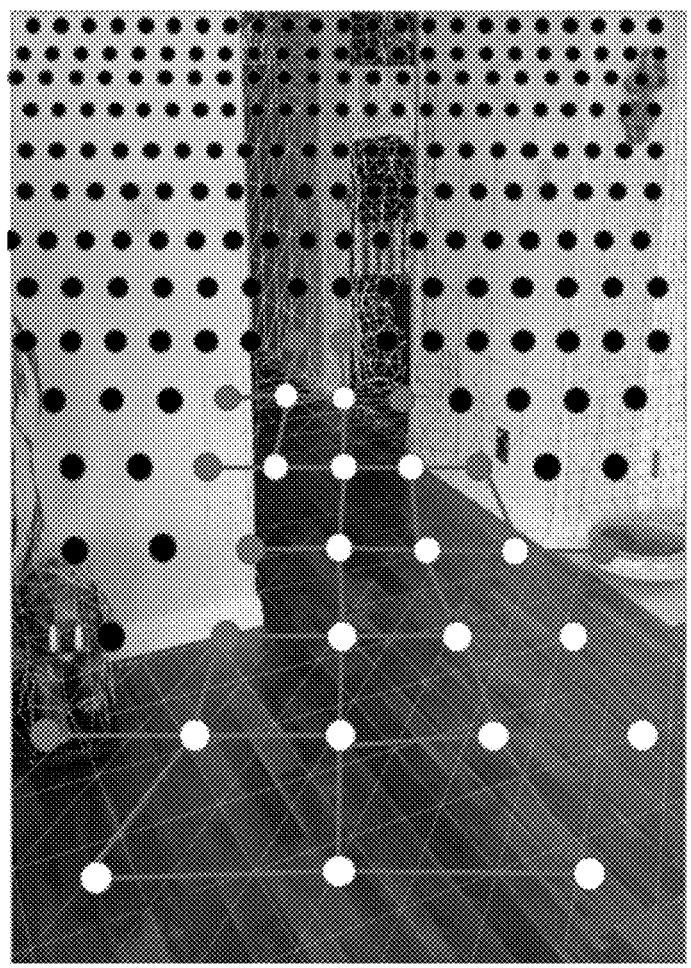
FIG. 6 illustrates a virtual graph of fixed grid of points overlaid within the scene, in accordance with an embodiment of the present disclosure.

Now referring to FIG. 6, the virtual graph of fixed grid of points overlaid within the scene, in front of the user is shown. The scene in front of the user may comprise a horizontal surface and vertical surface. The horizontal surface may be a floor and the vertical surface may be a wall. The probe signal obtained from the environment probe is used to recognize whether or not the floor is horizontal. If the floor is not horizontal, then it is not a floor. The processor (201) may be configured to place white dots on a navigable area and gray dots on a boundary. The area covered with white dots is the navigable area. The area covered with gray dots is a boundary. In one embodiment, the distance between the dots is 1 ft. The processor (201) may be configured for probing each node of the grid of nodes in order to check whether or not the point corresponding to said node is on floor.

In one embodiment, the processor (201) may be configured to determine the shortest path to a destination in the virtual graph by only considering the points on the floor. In one exemplary embodiment, Dijkstra's algorithm may be used to find the shortest path in the virtual graph to the destination. The processor (201) may be configured to convert the description of the shortest path and the scene into one or more of audio or Braille text instruction or combination thereof to the user. The processor (201) may be further configured to detect horizontal and vertical surface or obstacles and provide one or more of audio or Braille text indication to the user. In one embodiment, the speech to text module (208) may be configured to convert the description of the shortest path and scene into Braille text indication to the user. In one embodiment, the text to speech module (209) may be configured to convert the description of the shortest path and scene into audio indication to the user. The description may be enhanced with the distance information and directional orientation and ordered by "directional saliency", "saliency at rest" or "saliency in motion".

Figure 7:
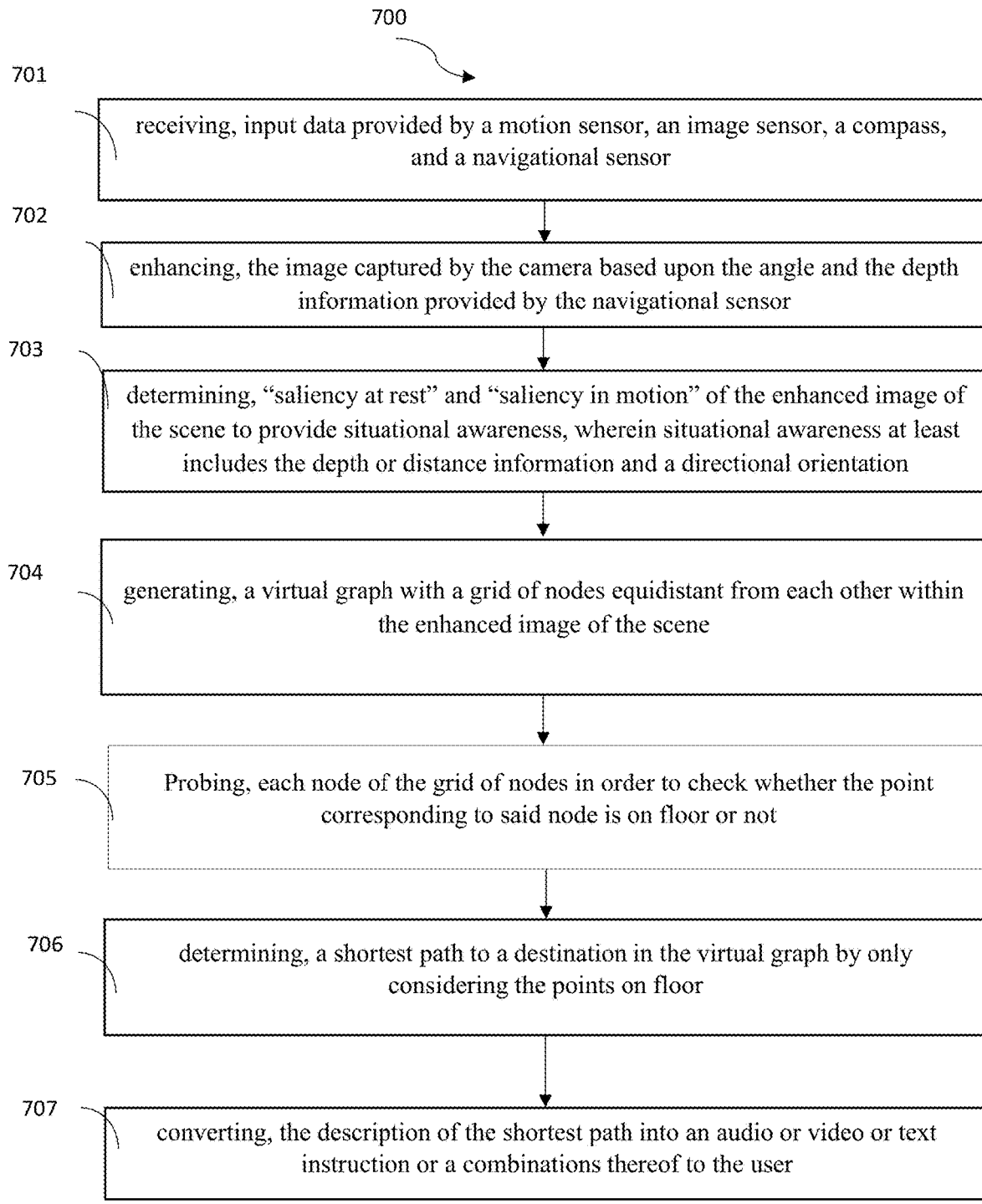
FIG. 7 illustrates a stepwise flowchart of a method (700) for providing indoor situational awareness and navigational aid for the visually impaired user, in accordance with an embodiment of the present disclosure.

Now referring to FIG. 7, a method for providing situational awareness and navigational aid for the blind and visually impaired user is illustrated, in accordance with the embodiment of the present disclosure.

At step 701, the processor (201) may receive input data provided by the motion sensor, the image sensor, the compass, and the depth sensor.

At step 702, the processor (201) may enhance the image captured by the camera based upon the angle and the depth information provided by the depth sensor.

At step 703, the processor (201) may determine "directional saliency", "saliency at rest" and "saliency in motion" of the enhanced image of the scene to provide situational awareness. The situational awareness at least includes the depth or distance information and the directional orientation.

At step 704, the processor (201) may generate the virtual graph with the grid of nodes equidistant from each other within the enhanced image of the scene.

At step 705, the processor (201) may probe each node of the grid of nodes in order to check whether or not the point corresponding to said node is on a floor.

At step 706, the processor (201) may determine the shortest path to the destination in the virtual graph by only considering the points on the floor.

At step 707, the processor (201) may convert the description of the shortest path and the scene into one or more of audio or Braille text instruction to the user. The description may be enhanced with the distance information and directional orientation and ordered by "directional saliency", "saliency at rest" or "saliency in motion".

In one embodiment, the system (101) of the present disclosure may make the navigation simple for the blind and visually impaired user.

The embodiments, examples and alternatives of the preceding paragraphs, the description, including any of their various aspects or respective individual features, may be taken independently or in any combination. Features described in connection with one embodiment are applicable to all embodiments unless such features are incompatible. Although implementations of the system and the method for providing indoor situational awareness and navigational aid for the visually impaired user have been described in language specific to structural features and/or methods, it is to be understood that the appended claims are not necessarily limited to the specific features or methods described. Rather, the specific features and methods are disclosed as examples of implementations of system and the method for providing indoor situational awareness and navigational aid for the visually impaired user.

What is claimed is:

1. A system for providing indoor situational awareness and navigational aid for the visually impaired user, wherein the system comprising:
    a motion sensor configured to detect motion of a user;
    an image sensor configured to capture an image of the scene, in front of the user;
    a compass;
    a depth sensor, wherein the depth sensor is configured to provide the depth information;
    a processor; and
    a memory, wherein the processor is configured to execute instructions stored in the memory for;
    receiving, input data provided by the motion sensor, the image sensor, the compass, and the depth sensor;
    enhancing, the image captured by the image sensor based upon the angle and the depth information provided by the depth sensor;
    determining, "directional saliency", "saliency at rest" and "saliency in motion" of the enhanced image of the scene to provide situational awareness, wherein situational awareness at least includes the depth or distance information and a directional orientation;
    generating, a virtual graph with a grid of nodes equidistant from each other within the enhanced image of the scene;
    probing each node of the grid of nodes in order to check whether or not the point corresponding to said node is on a floor;
    determining, the shortest path to a destination in the virtual graph by only considering the points on a floor; and
    converting, the description of the shortest path and the scene into one or more of audio or Braille text instruction to the user, wherein the description is enhanced with the distance information and directional orientation and ordered by "directional saliency", "saliency at rest" or "saliency in motion".

2. The system as claimed in claim 1, wherein the motion sensor is an accelerometer, and wherein the image sensor is a camera, and wherein the depth sensor is a Light Detection and Ranging (LiDAR) system.

3. The system as claimed in claim 1, wherein the "directional saliency", "saliency at rest" and "saliency in motion" are determined by returning a plurality of scene captions and their associated bounding boxes for the image.

4. The system as claimed in claim 3, wherein the process of returning scene captions bounding boxes closest to the saliency bounding box and collecting the captions for these bounding boxes is iteratively performed in order to form ordered set of scene captions.

5. The system as claimed in the claim 4, wherein the "saliency at rest" is configured to provide description of the components of the image which would have captured the attention of a person with vision.

6. The system as claimed in the claim 4, wherein the "directional saliency" is configured to provide description of the components of the image clockwise from left to right or anti-clockwise from right to left based on the preference of the user.

7. The system as claimed in claim 2, wherein the "saliency in motion" is determined by distance ordering provided by the LiDAR system.

8. The system as claimed in claim 7, wherein the "saliency in motion" is configured to provide description of the component of the image, which is closest to the user, when the user is in motion.

9. The system as claimed in claim 1 wherein the virtual graph with the grid of nodes comprising fixed grid of points overlaid within the scene, in front of the user wherein the shortest path in the virtual graph to the destination is determined using Dijkstra's algorithm.

10. The system as claimed in claim 1, wherein the system further comprises detecting horizontal and vertical surface or obstacles and provide one or more of audio or video or text indication to the user.

11. A method for providing indoor situational awareness and navigational aid for the visually impaired user, wherein the method comprising:
    receiving, via a processor, input data provided by a motion sensor, an image sensor, a compass, and a depth sensor;
    enhancing, via the processor, the image captured by the camera based upon the angle and the depth information provided by the depth sensor;
    determining, via the processor, "directional saliency", "saliency at rest" and "saliency in motion" of the enhanced image of the scene to provide situational awareness, wherein situational awareness at least includes the depth or distance information and a directional orientation;
    generating, via the processor, a virtual graph with a grid of nodes equidistant from each other within the enhanced image of the scene;
    probing, via the processor, each node of the grid of nodes in order to check whether or not the point corresponding to said node is on a floor;
    determining, via the processor, the shortest path to a destination in the virtual graph by only considering the points on the floor; and
    converting, via the processor, the description of the shortest path and the scene into an audio or Braille text instruction or a combination thereof to the user, wherein the description is enhanced with the distance information and directional orientation and ordered by "directional saliency", "saliency at rest" or "saliency in motion".

12. The method as claimed in claim 11, wherein the motion sensor is an accelerometer, and wherein the image sensor is a camera, and wherein the depth sensor is a Light Detection and Ranging (LiDAR) system.

13. The method as claimed in claim 11, wherein the "saliency at rest" is determined by returning a plurality of scene captions and their associated bounding boxes for the image.

14. The method as claimed in claim 13, wherein the process of returning scene captions bounding boxes closest to the saliency bounding box and collecting the captions for these bounding boxes is iteratively performed in order to form ordered set of scene captions.

15. The method as claimed in the claim 14, wherein the "saliency at rest" is configured to provide description of the components of the image which would have captured the attention of a person with vision.

16. The system as claimed in the claim 14, wherein the "directional saliency" is configured to provide description of the components of the image clockwise from left to right or anti-clockwise from right to left based on the preference of the user.

17. The method as claimed in claim 11, wherein the "saliency in motion" is determined by distance ordering provided by the LiDAR system.

18. The method as claimed in claim 17, wherein the "saliency in motion" is configured to provide description of the component of the image, which is closest to the user, when the user is in motion.

19. The method as claimed in claim 11, wherein the virtual graph with the grid of nodes comprising fixed grid of points overlaid within the scene, in front of the user, wherein the shortest path in the virtual graph to the destination is determined using Dijkstra's algorithm.

20. The method as claimed in claim 11, wherein the method further comprising detecting horizontal and vertical surface or obstacles and providing one or more of audio or video or text indication to the user.

21. A non-transitory computer readable medium storing program for providing indoor situational awareness and navigational aid for the blind and visually impaired user, wherein the program comprising programmed instructions, the programmed instructions comprising instructions for:
   receiving input data provided by a motion sensor, an image sensor, a compass, and a depth sensor;
   enhancing the image captured by the camera based upon the angle and the depth information provided by the depth sensor;
   determining "directional saliency", "saliency at rest" and "saliency in motion" of the enhanced image of the scene to provide situational awareness, wherein situational awareness at least includes the depth or distance information and a directional orientation;
   generating a virtual graph with a grid of nodes equidistant from each other within the enhanced image of the scene;
   probing each node of the grid of nodes in order to check whether or not the point corresponding to said node is on a floor;
   determining the shortest path to a destination in the virtual graph by only considering the points on the floor; and
   converting the description of the shortest path and the scene into an audio or Braille text instruction or a combination thereof to the user, wherein the description is enhanced with the distance information and directional orientation and ordered by "directional saliency", "saliency at rest" or "saliency in motion".

* * * * *